United States Patent
Hasebe et al.

[11] Patent Number: 5,528,094
[45] Date of Patent: Jun. 18, 1996

[54] DRIVE SYSTEM FOR ELECTRIC CARS

[75] Inventors: Masahiro Hasebe, Anjo; Shinichi Otake, Aichi, both of Japan

[73] Assignee: Aisin AW Co., Ltd., Japan

[21] Appl. No.: 219,168

[22] Filed: Mar. 28, 1994

[30] Foreign Application Priority Data

Mar. 29, 1993 [JP] Japan .................. 5-070582

[51] Int. Cl.$^6$ .................................... H02K 7/20
[52] U.S. Cl. .................. 310/112; 310/49 R; 310/114
[58] Field of Search ................. 310/49 R, 51, 310/75 R, 83, 112, 114; 318/34, 45, 85, 113

[56] References Cited

U.S. PATENT DOCUMENTS

| | | | |
|---|---|---|---|
| 3,173,042 | 3/1965 | Fodor | 310/112 |
| 3,483,410 | 12/1969 | Siegelman et al. | 310/112 |
| 3,979,652 | 9/1976 | Faxon | 310/112 X |
| 4,122,377 | 10/1978 | Drummond | 310/112 |
| 4,535,263 | 8/1985 | Avery | 310/112 |
| 4,739,201 | 4/1988 | Brigham et al. | 310/49 R |
| 4,785,213 | 11/1988 | Satake | 310/114 X |
| 4,945,296 | 7/1990 | Satake | 310/112 X |
| 5,068,559 | 11/1991 | Satake et al. | 310/112 |
| 5,177,384 | 1/1993 | Furuki | 310/49 R |
| 5,194,773 | 3/1993 | Clarke | 310/112 |

FOREIGN PATENT DOCUMENTS

| | | |
|---|---|---|
| 62-12358 | 1/1987 | Japan . |
| 63-178750 | 7/1988 | Japan . |
| 1-8853 | 1/1989 | Japan . |
| 1-64548 | 3/1989 | Japan . |
| 1-286758 | 11/1989 | Japan . |

*Primary Examiner*—Mark O. Budd
*Attorney, Agent, or Firm*—Lorusso & Loud

[57] ABSTRACT

A drive system comprises first and second motors for driving an electric car in response to alternating electric currents supplied to their coils. The first and second motors have their respective first and second rotors assembled on a common shaft at angular positions which are shifted by a first predetermined angle in their direction of rotation. Moreover, the first and second motors are energized by currents which are shifted in phase by a second predetermined angle. The first and second predetermined angles are individually determined in advance on the basis of the undesirable torque-fluctuation harmonic and the polar ratio of the motor. As a result, the torque fluctuations of the selected harmonic of the motor frequency of the first and second motors can offset each other to reduce the vibrations due to resonances.

9 Claims, 5 Drawing Sheets

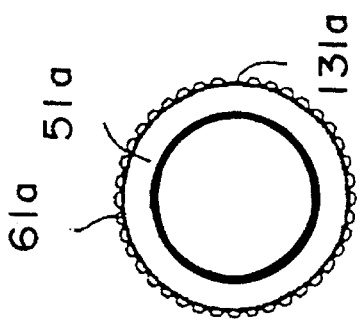
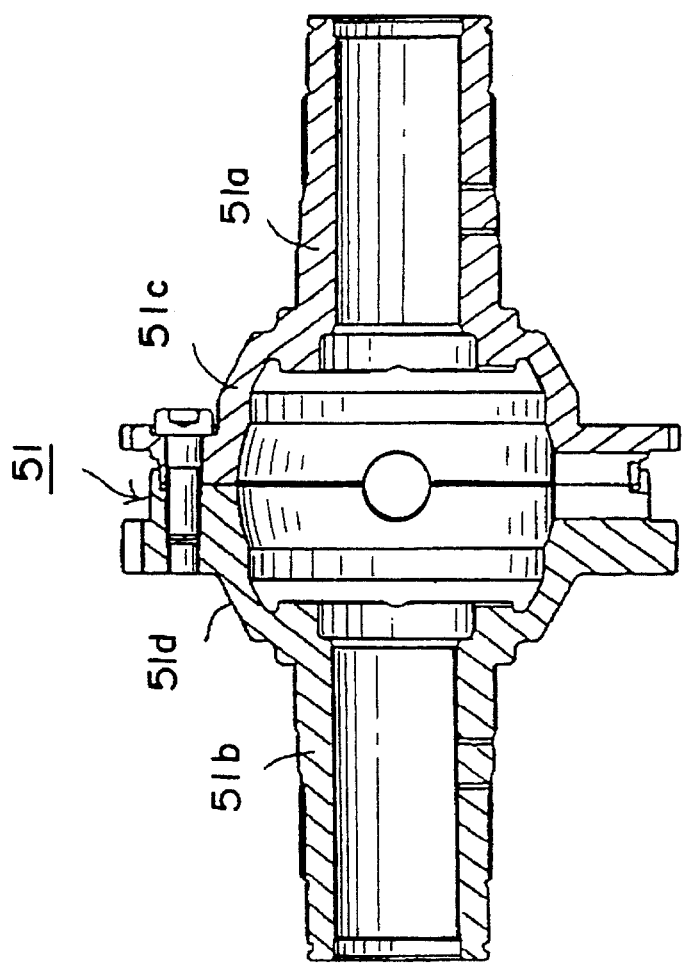
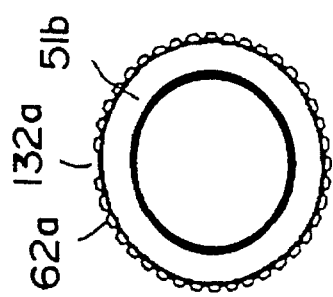

Coil Current

Phase Shift of 90 Degrees

Torque Fluctuation of Degree Sixth Harmonic

Electrical Angle Shift of 30 × h Degrees (h=1,3,5,......)

DRIVE SYSTEM FOR ELECTRIC CARS

BACKGROUND OF THE INVENTION

1. Field of the Invention

The present invention relates to an electric motor and, more particularly, to a drive system for the electric car.

2. Description of the Related Art

Some prior art electric cars utilize a brushless motor having a stator arranged around a rotor having a permanent magnet to produce the driving torque necessary to run the car.

In such motors, magnetic reactance fluctuates as the permanent magnet fixed on the rotor passes the stator pole gaps in the stator, so that a cogging torque (or slot ripple torque) composed of higher harmonics is superposed on the driving torque.

Specifically, the permanent magnet of the rotor is spaced from the inner circumference of the iron core of the stator to provide a constant rotational gap. The iron core of the stator is composed of an annular stator yoke, and a plurality of stator poles projecting radially inward from the stator yoke. As the rotor rotates, the magnetic flux through a given stator pole is moved to an adjacent stator pole. Since the adjoining stator poles are separated by a stator pole gap the movement of the magnetic flux is discontinuous. When the corner of the permanent magnet passes over the stator pole gap, the attraction and/or repulsion between the rotor and the stator poles pulsates to produce the cogging torque.

Because the motor operates over a wide range of angular velocities from zero or low angular velocity to a high angular velocity when mounted in the drive system of an electric car, vibration of the motor by the cogging torque may cause a resonance to occur at the intrinsic vibration resonant frequency of the suspension system of the car body and the motor. Therefore in one proposed prior art motor, the stator or rotor is skewed to prevent changes in the magnetic reactance when the corner of the permanent magnet passes over the stator pole gap (as disclosed in Japanese Patent Laid-Open No. 8853/1989).

In another proposal, the permanent magnet is magnetized to produce a sine-wave distribution of magnetic flux. This sine-wave magnetic flux distribution is designed to prevent cogging torque.

In the prior art electric motor with the skewed stator or rotor, the permanent magnets or the stator poles have to be constructed to establish the predetermined skew angle. This construction makes wiring winding operations difficult to automate so that production cost is increased. Also when the stator is skewed, the working efficiency of the motor is seriously degraded.

In motors designed to have rotors with sine-wave magnetic flux distribution the proper construction of the permanent magnets is difficult. Also the efficiency of motors where the permanent magnets have a sine-wave magnetic flux distribution is less than the efficiency of motors where the permanent magnets are magnetized with a square-wave magnetic flux distribution. Furthermore, the motors with a sine-wave permanent magnetic flux distribution have a lower maximum torque than motors with square-wave permanent magnetic flux distribution.

SUMMARY OF THE INVENTION

It is, therefore, an object of the present invention to solve the above-specified problems concomitant with the prior art electric car drive systems and to provide a drive system for an electric car with reduced torque fluctuations without sacrifice of working efficiency or energy efficiency.

According to the present invention, there is provided a drive system having first and second motors for driving an electric car responsive to phase currents supplied to their coils. The first and second motors have rotors mounted with a shift of a first predetermined angle in their direction of rotation relative to their stators. Moreover, The first and second motors have their phase currents shifted in phase by a second predetermined angle. The first and second predetermined angles are individually determined in advance on the basis of the frequency or harmonic of torque fluctuations to be eliminated and the polar ratio of the motor. As a result, the torque fluctuations of the motors can offset each other to reduce the vibrations due to resonances by shifting the phases of the torque fluctuation of the first and second motors.

Moreover, the exciting timings for exciting the coils of the first and second motors can be shifted, and the torque fluctuations of the selected harmonics of the first and second motors can be offset to reduce the output torque fluctuations and the vibrations due to the resonances.

Moreover, neither the permanent magnets nor the stator poles need be arranged with a predetermined skew angle so that the wiring operation can be facilitated and automated to lower the production cost. The magnetic flux distribution need not be adjusted to improve energy efficiency or to increase the torque obtainable.

BRIEF DESCRIPTION OF THE DRAWINGS

FIG. 3A is a sectional view of the cylindrical portion 51b of a common hollow shaft for mounting a second rotor 42; FIG. 3B is a sectional view of the differential casing 51 serving as a common rotor shaft; and FIG. 3C is a sectional view of a cylindrical portion 51a of the common shaft for mounting a first rotor 41.

DESCRIPTION OF THE PREFERRED EMBODIMENT

An embodiment of the present invention will be described in detail in the following with reference to the accompanying drawings.

Figure 1:
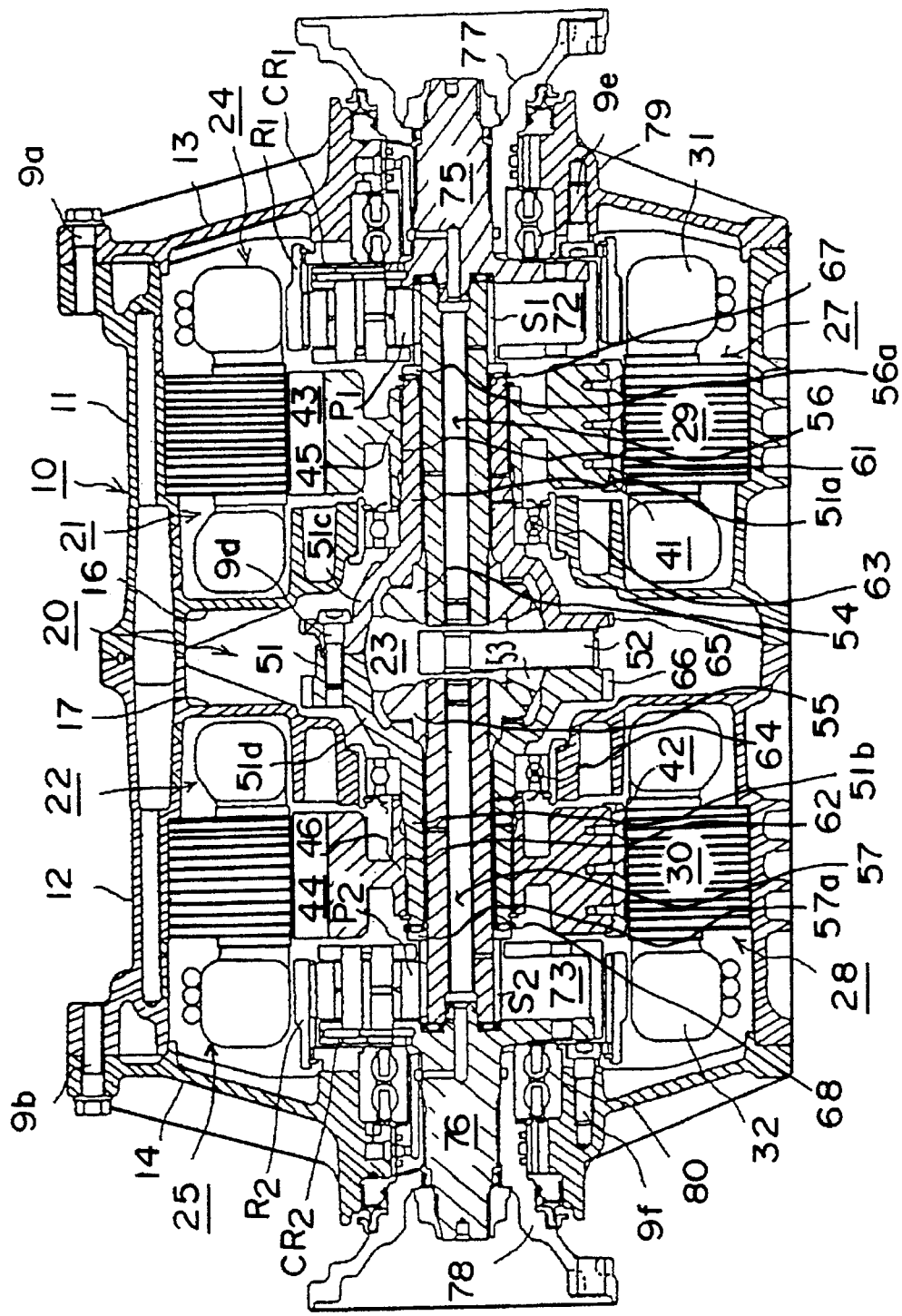
FIG. 1 is a sectional view showing a drive system for an electric car according to an embodiment of the present invention.

In FIG. 1: reference numeral 10 designates a drive system casing; numeral 11 a first center casing having a cylindrical shape; and numeral 12 a second center casing having a cylindrical shape. These first and second center casings 11 and 12 have mating end faces joined to each other. A first dish-shaped side cover 13 is joined to the first center casing 11, and a second dish-shaped side cover 14 is joined to the second center casing 12. These first and second center casings 11 and 12 have radially extending partitions 16 and 17.

The first and second center casings 11 and 12 are joined by means of bolts (not-shown), and the first and second side covers 13 and 14 are faucet-jointed to the first and second center casings 11 and 12 by means of bolts 9a and 9b. As a result, a differential mechanism chamber 20 is formed between the partitions 16 and 17, and motor chambers 21 and 22 are respectively formed between the partition 16 and the first side cover 13 and between the partition 17 and the second side cover 14. A differential mechanism 23 is mounted in the differential mechanism chamber 20, and a pair of first and second motors 24 and 25, for example, are mounted in the motor chambers 21 and 22. The partitions 16 and 17 have axial portions extending toward the wheels (i.e., rightward and leftward of the drawing), axially of the first and second motors 24 and 25, so that the differential mechanism 23 is mounted on the axis of the differential mechanism chamber 20.

The first and second motors 24 and 25 have, respectively, stators 27 and 28 with iron cores 29 and 30 and coils 31 and 32. The iron cores 29 and 30 are fixed to the inner circumferences of the first and second center casings 11 and 12.

The first and second motors 24 and 25 also have respective first and second rotors 41 and 42 composed of permanent magnets 43 and 44 which are rotatably mounted radially within the iron cores 29 and 30. Spindles 45 and 46 supported by the differential mechanism 23, in turn, support the permanent magnets 43 and 44.

The differential mechanism 23 includes a differential casing 51 made of a sufficiently rigid material, a pinion shaft 52 extending through the differential casing 51, a pinion 53 mounted for rotation relative to the pinion shaft 52 and first and second side gears 54 and 55 meshing with the pinion 53.

The first and second side gears 54 and 55 differentiate the rotation transmitted to the differential casing 51 and transmit the differentiated rotation to first and second drive shafts 56 and 57 extending to the right and left of the car body. The differential casing 51 includes cylindrical portions 51a and 51b extending around the first and second drive shafts 56 and 57 and body portions 51c and 51d formed between the cylindrical portions 51a and 51b. The differential casing 51 is formed by fixing the body portions 51c and 51d by means of bolts 9d with the cylindrical portions 51a and 51b supporting the spindles 45 and 46.

The outer circumferences of the cylindrical portions 51a and 51b and the inner circumferences of the spindles 45 and 46 are splined together through splines 61 and 62, and bearings 63 and 64 are arranged between the outer circumferences of the innermost portions of the cylindrical portions 51a and 51b and the partitions 16 and 17 to rotatably support the differential mechanism 23.

The cylindrical portions 51a and 51b and the first and second drive shafts 56 and 57 are mounted with suitable clearances therebetween so that they can freely rotate relative to each other. As a result, the first and second drive shafts 56 and 57 rotate relative to the cylindrical portions 51a and 51b when the differential mechanism 23 differentially rotates.

The body portion 51c the differential casing 51 in the differential mechanism 20 has its outer circumference formed integrally with a sensor gear 65 which is connected to a sensor not-shown, and the body portion 51d has its outer circumference formed integrally with a parking gear 66.

Annular support members 56a and 57a are carried on the leading ends of the first and second drive shafts 56 and 57, and thrust bearings 67 and 68 are arranged between the support members 56a and 57a and the abutting ends of cylindrical portions 51a and 51b.

At the wheel sides of the support members 56a and 57a are planetary gear units 72 and 73. These planetary gear units 72 and 73 include sun gears $S_1$ and $S_2$, pinions $P_1$ and $P_2$ meshing with the sun gears $S_1$ and $S_2$, carriers $CR_1$ and $CR_2$ supporting the pinions $P_1$ and $P_2$ and ring gears $R_1$ and $R_2$ meshing with the pinions $P_1$ and $P_2$. The sun gears $S_1$ and $S_2$ are formed integrally with the first and second drive shafts 56 and 57, and the ring gears $R_1$ and $R_2$ are fixed on the first and second side covers 13 and 14 by means of bolts 9e and 9f.

The axial wheel sides of the carriers $CR_1$ and $CR_2$ are connected to transmission shafts 75 and 76, through which are connected wheel shafts 77 and 78. These wheel shafts 77 and 78 are rotatably supported by the first and second side covers 13 and 14 through the transmission shafts 75 and 76 and bearings 79 and 80.

In the planetary gear units 72 and 73 rotational input is from the first and second drive shafts 56 and 57 to the sun gears $S_1$ and $S_2$ with an output of reduced rotation from the carriers $CR_1$ and $CR_2$ to the transmission shafts 75 and 76, i.e., the wheel shafts 77 and 78. The wheels (not shown) are connected to the wheel shafts 77 and 78 through the universal joint (not-shown) so that the electric car is run by the rotational force transmitted to the wheel shafts 77 and 78.

When the first and second motors 24 and 25 are energized, the first and second rotors 41 and 42 are rotated and in turn rotate the differential casing 51 through the splines 61 and 62. This rotation is then differentiated by the differential mechanism 23 between the pinion 53 and the side gears 54 and 55 and is transmitted to the first and second drive shafts 56 and 57.

The rotational forces thus transmitted to the first and second drive shafts 56 and 57 are input to the sun gears $S_1$ and $S_2$ of the planetary gear units 72 and 73, wherein they are decelerated and output by the carriers $CR_1$ and $CR_2$. The rotation thus output from the carriers $CR_1$ and $CR_2$ is transmitted through the transmission shafts 75 and 76 and the wheel shafts 77 and 78 to the universal joint and the wheels to drive the electric car.

The first and second motors 24 and 25 include the first and second rotors 41 and 42 composed of the six-pole permanent magnets 43 and 44 and the coils 31 and 32 composed of three-phase wiring.

Figure 2:
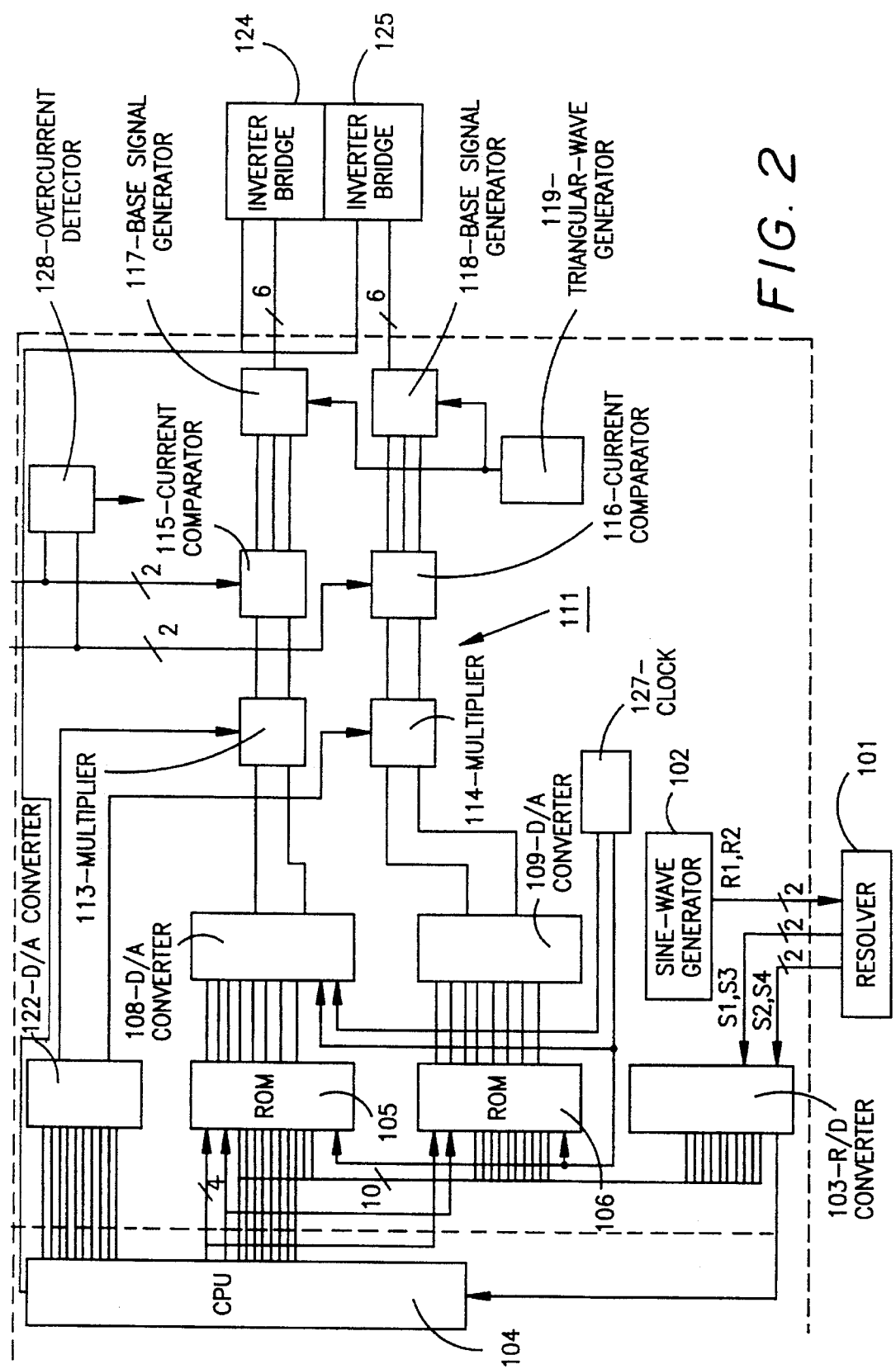
FIG. 2 is a schematic diagram showing a control circuit for the drive system for an electric car according to the embodiment of FIG. 1.

Referring now to FIG. 2, the rotor of a resolver 101, although not shown in FIG. 1, has its shaft arranged in parallel with the axis of the first and second motors 24 and 25 and is connected to the sensor gear 65 so that the single resolver 101 can detect the absolute positions of the magnetic poles of the first and second rotors 41 and 42 of the first and second motors 24 and 25. A sine-wave generator 102 supplies AC voltages R1 and R2 to the resolver 101. Resolver 101 detects the absolute positions of the magnetic poles of the first and second rotors 41 and 42 and converts signals of AC voltages R1 and R2 into output excitation position signals S1 to S4 fed to a resolver to digital (R/D) converter 103.

This R/D converter 103 converts the excitation position signals S1 to S4 to digital absolute position data fed to a CPU 104 and the same, as digital absolute position signals to ROMs 105 and 106 which are provided for the first and second motors 24 and 25, respectively.

These ROMs 105 and 106 contain respective stored sine-wave data each having two phases shifted by ⅔ from each other. The ROMs convert the digital absolute position signals output from the R/D converter 103 into sine-wave digital signals having U and V phases. The sine-wave digital signals U and V are fed to digital to analog (D/A) converters 108 and 109 wherein they are converted into analog signals (sin x and sin(x+2/3)) having the U and V phases, which are output to a current waveform control circuit 111.

The current waveform control circuit 111 is composed of multipliers 113 and 114, current comparators 115 and 116, base signal generators 117 and 118, and a triangular-wave generator 119 for generating saw-tooth waves. The multipliers 113 and 114 receive not only the U- and V-phase analog signals indicating the absolute positions of the magnetic poles, which are outputted from the D/A converters 108 and 109, but also demand signals, which are determined by the CPU 104 on the basis of the load conditions such as the acceleration signals and received as torque command signals from a D/A converter 122. As a result, the multipliers 113 and 114 output the U- and V-phase AC signals (Isin x and sin(x+2π/3)) having specified phases and amplitudes to the current comparators 115 and 116.

Current comparators 115 and 116 add and amplify the U- and V-phase AC signals by the feedback signals of the phase currents respectively fed to the U-phase and V-phase of the first and second motors 24 and 25 and calculate the W-phase AC signal (Isin(x+4π/3)) to output the same together with the U- and V-phase AC signals to the base signal generators 117 and 118. These base signal generators 117 and 118 receive at their input terminals the output of the triangular-wave generator 119 together with the U-, V- and W-phase AC signals of the current comparators 115 and 116 and they output the PWM signals having determined phases and duty ratios to inverter bridges 124 and 125.

Thus, the first and second motors 24 and 25 can be controlled by the single resolver 101, allowing use of a simplified sensor.

Reference numeral 127 designates a clock generator, and numeral 128 designates an over-current detector.

Figure 4:
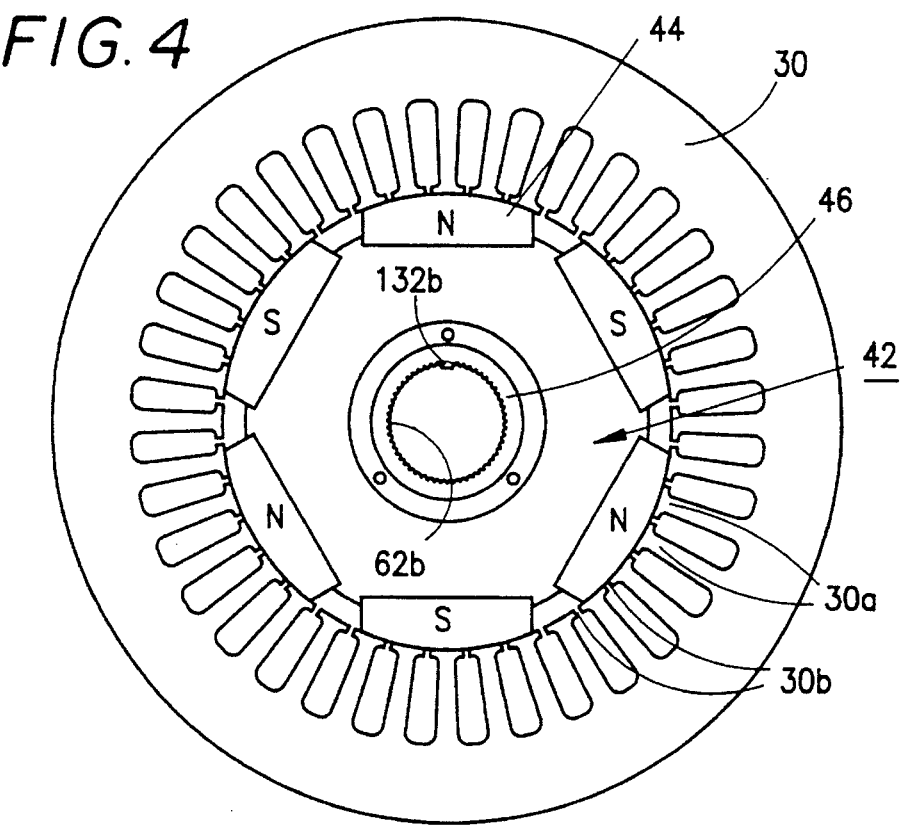
FIG. 4 is a cross-sectional view of an assembled second rotor of the embodiment of FIG. 1.
Figure 5:
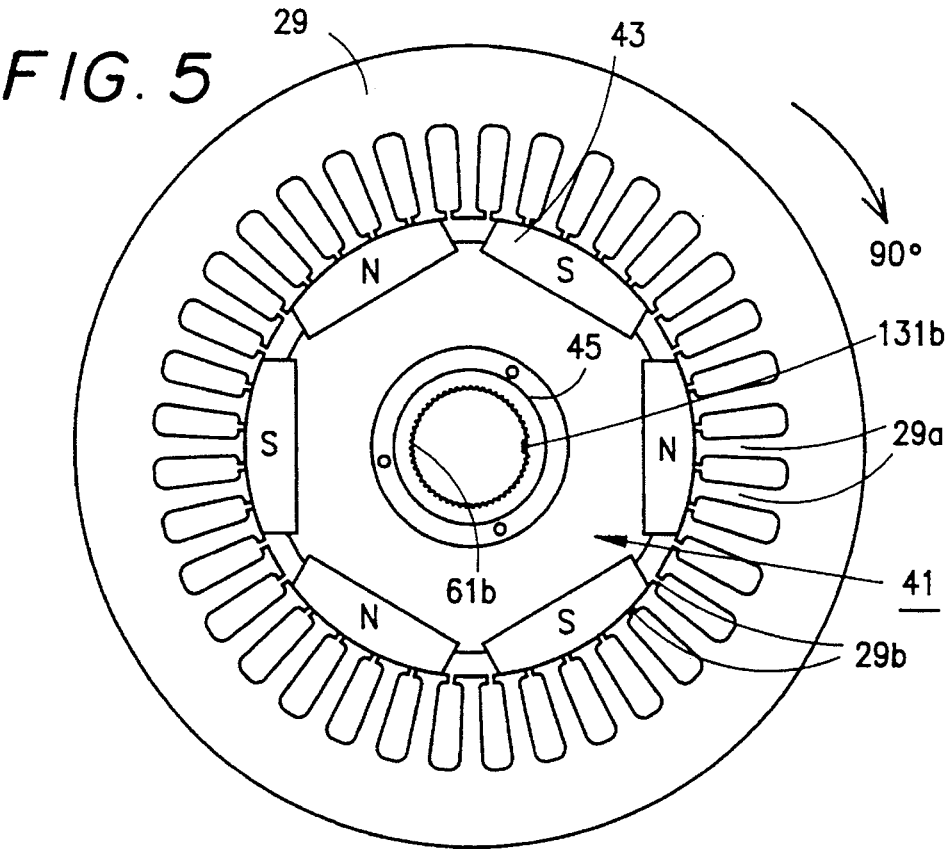
FIG. 5 is a cross-sectional view of an assembled first rotor of the embodiment of FIG. 1.

The first and second rotors 41 and 42 of the first and second motors 24 and 25 are equipped with the permanent magnets 43 and 44. Moreover as shown in FIGS. 4 and 5, the stators 27 and 28 have their iron cores 29 and 30 formed with a plurality of stator poles 29a and 30a separated by stator pole gaps 29b and 30b. As the permanent magnets pass over the stator poles and stator gaps, the magnetic reactance fluctuates to produce cogging torques composed of higher harmonics fluctuating the driving torques.

In short, the cogging torques of the first and second motors 24 and 25 can be indicated by waveforms which are prepared by combining the sine waves of the individual cogging harmonics of the motor frequencies. When the first and second motors 24 and 25 are driven at a rate of revolution corresponding to the running conditions of the electric car, the torque fluctuations correspond to the sine-waves of the cogging harmonics. The torque fluctuations of selected harmonics are reduced by selecting in advance the harmonics producing the highest fluctuation level and the harmonics having a frequency coincident to the intrinsic vibrational resonant frequency of the car body.

Hence, the first and second rotors 41 and 42 of the paired first and second motors 24 and 25 have their assembled positions shifted by a predetermined angle from each other. For this shift, the second rotor 42 arranged at the lefthand side of the car body is assembled on the common shaft 51 at a reference angular position, whereas the first rotor 41 arranged at the righthand side of the car body is assembled on the common shaft 51 with an annular displacement of a predetermined angle in the direction of rotation from the reference position.

In order to reduce the torque fluctuations of the selected harmonic, it is preferable to offset the sine waves energizing the first motors relative to the sine waves energizing the second motor to reduce the torque fluctuations to zero. To reduce the selected harmonic to zero, the phase of the coil sine waves of the first motor 24 is shifted relative to the phase of the coil sine waves of the second motor 25 so that the phase of the torque fluctuations of the selected harmonic produced by the first motor differ by an multiple of 180° from two phase of the torque fluctuations of the selected harmonic produced by the second motor.

The predetermined angle can be determined from the order g of the selected harmonic of torque fluctuation. The predetermined angle can be expressed by an electrical angle $\Theta_E$:

$$\Theta_E = 180 \cdot n/g \text{[degrees]}, (n=1, 3, 5, ---).$$

Moreover, the predetermined angle can be expressed by a mechanical (or geographical) angle $\Theta_M$:

$$\Theta_M = \Theta_E/P$$

where p is the polar ratio (the number of magnetic motor poles divided by two).

If the torque fluctuations of the sixth harmonic are to be reduced, for example, g is six. If the first and second rotors 41 and 42 each have six magnetic poles, the predetermined angles are calculated for the polar ratio p=3:

$$\Theta_E = 180 \cdot n/6 = 30 \cdot n \text{ degrees;}$$

and $$\Theta_M = 30 \cdot n/3 = 10 \cdot n \text{ degrees.}$$

In short, for a pair of six pole motors, the torque fluctuations of the sixth harmonic can be reduced by shifting the assembled position of the first rotor 41 from that of the second rotor 42 by 10·n degrees.

Here will be described the assembled states of the first and second rotors 41 and 42 with additional reference to FIGS. 3 to 5.

In these FIGS. 3A, 3B, 3C, 4 and 5 numerals 29 and 30 designate the iron cores; numeral 41 the first rotor; numeral 42 the second rotor; numerals 43 and 44 the permanent magnets; numerals 45 and 46 the spindles; numeral 51 the differential casing or common rotor shaft; numerals 51a and 51b the cylindrical portions; and numerals 51c and 51d the body portions.

The cylindrical portions 51a and 51b have splined outer surface portions 61a and 62a, respectively, and the spindles 45 and 46 of the first and second rotors 41 and 42, corresponding to the cylindrical portions 51a and 51b, have their inner circumferences formed with spline grooves 61b and 62b. In the present embodiment, the spline teeth 61a and 62a each number 40, and correspond to 9°.

Thus, the minimum number of teeth necessary for shifting the assembled position of the first rotor 41 from that of the second rotor 42 by 10·n° is 10, and the mechanical angle $\Theta_M$ of ten teeth is 90°. Thus, the assembled position of the first rotor 41 may be shifted by 90° from that of the second rotor 42.

In order to assemble the second rotor 42 in the reference position, a notch 132a is formed at the reference position, at which the mechanical angle $\Theta_M$ of the spline teeth 62a is 0°

(zero), and a notch 132b is formed at the position where the mechanical angle $\Theta_M$ of the spline teeth 62b is 0°. In order to assemble the first rotor 41 with a displacement of the mechanical angle $\Theta_M$ of 90° from the second rotor 42, a notch 131a is formed at the position where the mechanical angle $\Theta_M$ of the spline teeth 61a is 90°, and a notch 131b is formed at the position where the mechanical angle $\Theta_M$ of the spline teeth 61b is 90°.

With the first rotor 41 shifted by the mechanical angle $\Theta_M$ of 90° from the second rotor 42, it is also possible to reduce the torque fluctuations of harmonics two, ten and fourteen.

Thus, the output torque fluctuations of a pair of motors can be reduced by offsetting the torque fluctuations of selected harmonics. Correspondingly, the excitation timings for exciting the coils 31 and 32 of the first and second motors 24 and 25 are shifted from each other.

Figure 6A:
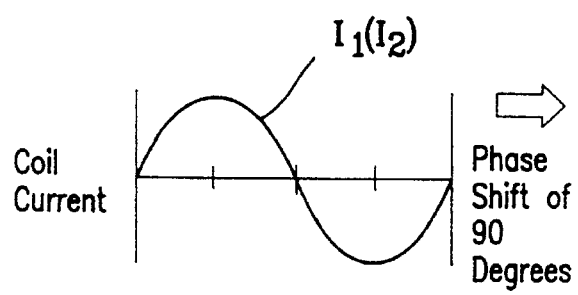
FIGS. 6A and 6C are diagrams showing a relative shift in U-phase currents $I_1$ and $I_2$ and FIGS. 6B and 6D are diagrams showing the effect of a shift of 30° of the electrical angle of the fundamental on the sixth harmonic.
Figure 6C:
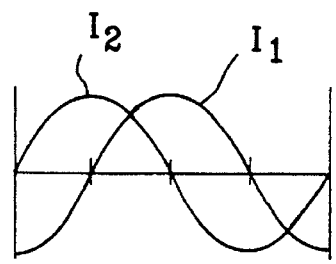
Figure 6B:
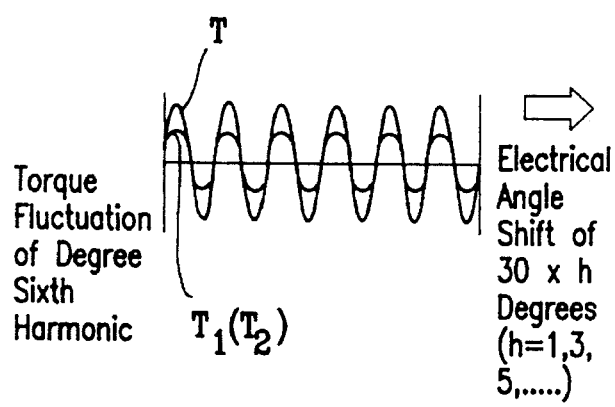
Figure 6D:
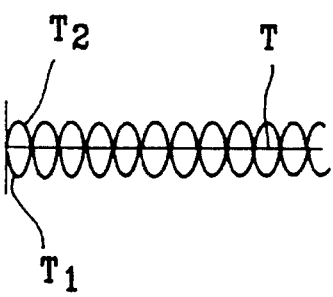

FIGS. 6A and 6C are diagrams showing a relative shift in U-phase currents and FIGS. 6B and 6D are diagrams showing the effect of a shift of 30° of the electrical angle of the fundamental on the sixth harmonic.

In order to shift the exciting timings for exciting the coils 31 and 32 of the first and second motors 24 and 25 from each other, the phases of the U-, V- and W-phase currents of the first motor 24 and of the U-, V- and W-phase currents of the second motor 25 are shifted from each other by a predetermined angle so that the sine wave of the torque fluctuation of the selected harmonic g of the first motor 24 and the sine wave of the torque fluctuations of the selected harmonic g of the second motor 25 may be offset to reduce the overall torque fluctuations to 0 when they are combined.

For example, if torque fluctuation of the sixth harmonic is to be reduced, g is six. In case the first and second rotors 41 and 42 each have six magnetic poles, the polar ratio p is 3 so that the electrical angle $\Theta_E$ is calculated as:

$$\Theta_E = 30 \cdot n \text{ degrees}$$

Thus, the phase of the currents to be fed to the coils 31 of the first motor 24 and the phase of the currents to be fed to the coils 32 of the second motor 25 may be set different so that the individual phases of torque fluctuation $T_1$ of the sixth harmonic in the first motor 24 and the fluctuation $T_2$ of the sixth harmonic in the second motor 25 can be shifted by the electrical angle $\Theta_E$. For this shift, the phases of the sine-wave data stored in the ROMs 105 and 106 (of FIG. 2) are shifted from each other by a predetermined angle.

Alternatively, the sine-wave data for driving the first and second motors 24 and 25 may be produced by providing only the ROM 105 to store the sine-wave data and by connecting an adder (not-shown) with the ROM 105. In this case, the sine-wave data for driving the second motor 25 is produced and output to the D/A converter 109 by outputting the sine-wave data read out for driving the first motor 24 to the D/A converter 108 and the adder and by adding the value of the phase shift to the sine-wave data by the adder.

Moreover, the addresses of the sine-wave data to be read out for driving the first and second motors 24 and 25 may be changed to the extent of the phase shift by storing the sine-wave data in one of the ROMs 105 and 106.

FIGS. 6A and 6C are diagrams showing a relative shift in U-phase currents and FIGS. 6B and 6D are diagrams showing the effect of a shift of 30° of the electrical angle of the fundamental on the sixth harmonic. In FIG. 6: reference letter $I_1$ designates the phase current to be fed to the coil 31 of the first motor 24; letter $I_2$ the current fed to the coil 32 of the second motor 25; letter $T_1$ the torque fluctuation of the sixth harmonic produced in the first motor 24; letter $T_2$ the torque fluctuation of the sixth harmonic produced in the second motor 25; and letter T the sum of the individual torque fluctuations $T_1$ and $T_2$.

As shown, the sum T of the torque fluctuation $T_1$ and $T_2$ can be offset to reduce the torque fluctuations of the sixth harmonic by shifting the individual phases of the phase current $I_1$ of the first motor 4 and the phase current $I_2$ of the second motor 25 by 90° from each other which, with the angular offset of the rotors, shifts the individual phases of the torque fluctuation $T_1$ of the sixth harmonic produced in the first motor 24 relative to the torque fluctuation $T_2$ of the sixth harmonic produced in the second motor 25 by a phase angle of 180°.

In the present invention, the permanent magnets 43 and 44 and the stator poles 29a and 30a need not be arranged to form a predetermined skew angle, so that the wiring can be facilitated and automated to reduce the production cost. Moreover, the distribution of magnetic fluxes in the permanent magnets 43 and 44 need not be adjusted to improve energy efficiency or to increase the torque obtainable.

In order to shift the exciting timings for exciting the coils 31 and 32 of the first and second motors 24 and 25 from each other, the timings for feeding the currents to the first and second motors 24 and 25 can be shifted without shifting the assembled positions of the stators 27 and 28. In other words, the torque fluctuation can be easily reduced without having the assembled positions of the stators 27 and 28 shifted relative to each other but, rather, solely shifting the relative phases of the currents to the first and second motors.

The present invention is not be limited to the above-described embodiment, but can be modified in various manners without departing from the gist thereof, and these modifications should not be excluded from the scope of the invention as defined by the appended claims.

What is claimed is:

1. A drive system for an electric car comprising:

first and second electric motors for driving the electric car;

said first and second motors having (a) respective first and second rotors with permanent magnets, (b) respective first and second stators, and (c) respective first and second pluralities of electrical energizing coils;

said first rotor having a first relative rotative position with respect to said first stator which first relative rotative position at any instantaneous time is shifted by a predetermined mechanical angle $\Theta_M$ from a second relative rotative position of said second rotor with respect to said second stator wherein $$\theta_M = \frac{180 \times n}{g \times p}$$

with n being an odd integer, g being an order of a selected harmonic, and p being a polar ratio;

means for applying first and second alternating currents to the respective first and second pluralities of electrical energizing coils; and said first alternating currents being shifted in phase by a predetermined electrical angle $\Theta_E$ from the second alternating currents wherein $$\theta_E = \frac{180 \times n}{g}$$

whereby said predetermined mechanical and electrical angles reduce torque fluctuations.

2. A drive system as claimed in claim 1 wherein the first and second rotors are mounted on a common shaft.

3. A drive system as claimed in claim 2 wherein the first rotor is mounted on the common shaft with a shift of the predetermined mechanical angle relative to the second rotor.

4. A drive system as claimed in claim 1 wherein the predetermined mechanical and electrical angles are determined on the basis of an selected undesired harmonic of torque fluctuations of the motor.

5. A drive system as claimed in claim 1 wherein said means for applying first and second alternating currents to the respective first and second pluralities of electrical energizing coils comprises rotor position detecting means for detecting magnetic positions of said first and second rotors;

first and second inverter bridges for controlling the respective first and second electric motors; and a control circuit for controlling said first and second inverter bridges on the basis of output signals from said rotor position detecting means.

6. A drive system for an electric car comprising:

first and second electric motors for driving the electric car;

said first and second motors having (a) respective first and second rotors with permanent magnets mounted on a common shaft, (b) respective first and second stators, and (c) respective first and second pluralities of electrical energizing coils;

a differential mechanism mounted within said common shaft for transmitting differentiated rotation from said common shaft to first and second drive shafts transmitting rotation to respective wheels;

said first rotor shifted by a predetermined mechanical angle $\Theta_M$ from said second rotor wherein $$\theta_M = \frac{180 \times n}{g \times p}$$

with n being an odd integer, g being an order of a selected harmonic, and p being a polar ratio;

means for applying first and second alternating currents to the respective first and second pluralities of electrical energizing coils; and said first alternating currents being shifted in phase by a predetermined electrical angle $\Theta_E$ from the second alternating currents wherein $$\theta_E = \frac{180 \times n}{g}$$

whereby said predetermined mechanical and electrical angles reduce torque fluctuations.

7. A drive system as claimed in claim 6 wherein said means for applying first and second alternating currents to the respective first and second pluralities of electrical energizing coils comprises rotor position detecting means for detecting magnetic positions of said first and second rotors;

first and second inverter bridges for controlling the respective first and second electric motors; and a control circuit for controlling said first and second inverter bridges on the basis of output signals from said rotor position detecting means.

8. A drive system as claimed in claim 6 wherein said common shaft is a differential casing, and said differential mechanism includes:

a pinion shaft connected to the differential casing;

a pinion mounted on said pinion shaft for transmitting rotation relative to said pinion shaft; and first and second side gears mounted on the respective first and second drive shafts and meshed with said pinion for transmitting rotation from said pinion to said first and second drive shafts.

9. A drive system as claimed in claim 6 further comprising first and second planetary gear units located between the corresponding first and second drive shafts and the respective wheels for transmitting reduced rotation from said first and second drive shafts to said wheels.

* * * * *